United States Patent
Plechinger et al.

(10) Patent No.: US 12,120,640 B2
(45) Date of Patent: Oct. 15, 2024

(54) COMMUNICATION DEVICE, CONTROL COMPONENT, MOBILE STATION, VEHICLE SYSTEM, METHOD AND COMPUTER PROGRAM FOR CONFIGURING LOCAL WIRE-FREE COMMUNICATION BETWEEN THE COMMUNICATION DEVICE AND A MOBILE DEVICE CLOSE TO A VEHICLE

(71) Applicant: Audi AG, Ingolstadt (DE)

(72) Inventors: Jörg Plechinger, Munich (DE); Christoph Voigt, Kösching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/049,201

(22) PCT Filed: Apr. 9, 2019

(86) PCT No.: PCT/EP2019/058893
§ 371 (c)(1),
(2) Date: Dec. 18, 2020

(87) PCT Pub. No.: WO2019/201664
PCT Pub. Date: Oct. 24, 2019

(65) Prior Publication Data
US 2021/0243725 A1    Aug. 5, 2021

(30) Foreign Application Priority Data

Apr. 20, 2018   (DE) ................... 10 2018 206 068.1

(51) Int. Cl.
*H04W 72/02*   (2009.01)
*H04W 4/40*    (2018.01)
(Continued)

(52) U.S. Cl.
CPC ............. *H04W 72/02* (2013.01); *H04W 4/40* (2018.02); *H04W 72/0453* (2013.01); *H04W 72/23* (2023.01); *H04W 92/18* (2013.01)

(58) Field of Classification Search
CPC ............. H04W 4/40–48; H04W 72/02; H04W 72/042; H04W 72/0453; H04W 92/18;
(Continued)

(56) References Cited

U.S. PATENT DOCUMENTS 8,514,825 B1    8/2013   Addepalli et al.
10,609,654 B2 *  3/2020   Misener .............. H04W 52/383
(Continued)

FOREIGN PATENT DOCUMENTS

CN    106376082 A    2/2017
DE    10243826 A1    4/2004
(Continued)

OTHER PUBLICATIONS

International Search Report and Written Opinion of the International Searching Authority directed to related International Patent Application No. PCT/EP2019/058893, mailed Jul. 22, 2019, with attached English-language translation; 21 pages.
(Continued)

*Primary Examiner* — Thomas R Cairns
(74) *Attorney, Agent, or Firm* — Sterne, Kessler, Goldstein & Fox P.L.L.C.

(57) ABSTRACT

Embodiments of the present disclosure relate to a method, a communication device, a control component, a mobile station, a vehicle, a system, and computer programs for configuring local wireless communication between the communication device and a mobile device close to a vehicle or between mobile devices of a mobile radio system that are close to a vehicle. The communication device comprises a transceiver, which is designed for communication with a
(Continued)

control component of the mobile radio system; a control module, which is coupled to the transceiver and is designed to control the transceiver, wherein the control module is also designed to communicate in a first frequency band in the mobile radio system in order to obtain a configuration of a second frequency band of the mobile radio system for the local wireless communication. The control module is also designed to continue to communicate the configuration for the local wireless communication in the second frequency band to at least one mobile device of the mobile radio system that is close to a vehicle.

15 Claims, 5 Drawing Sheets

(51) Int. Cl.
*H04W 72/0453* (2023.01)
*H04W 72/23* (2023.01)
*H04W 92/18* (2009.01)

(58) Field of Classification Search
CPC ......... H04W 72/23–232; H04W 72/40; H04W 76/14; H04W 2392/18
See application file for complete search history.

(56) References Cited

U.S. PATENT DOCUMENTS

| | | | |
|---|---|---|---|
| 2015/0016330 A1* | 1/2015 | Schwartz | H04W 40/22 370/312 |
| 2017/0142725 A1* | 5/2017 | Mohaupt | H04W 4/40 |
| 2017/0289733 A1 | 10/2017 | Rajagopal et al. | |
| 2018/0049073 A1* | 2/2018 | Dinan | H04W 72/1257 |
| 2018/0098322 A1 | 4/2018 | Yoon | |
| 2018/0184273 A1 | 6/2018 | Li | |
| 2019/0104530 A1* | 4/2019 | Deng | H04W 8/245 |
| 2019/0223008 A1* | 7/2019 | Vanderveen | H04W 92/18 |
| 2019/0230631 A1* | 7/2019 | Zhao | H04W 72/0453 |
| 2019/0394786 A1* | 12/2019 | Parron | H04L 5/0032 |
| 2020/0367035 A1* | 11/2020 | Lee | H04W 72/02 |

FOREIGN PATENT DOCUMENTS

| | | |
|---|---|---|
| DE | 102014117360 B3 | 2/2016 |
| WO | WO 2016/181240 A1 | 11/2016 |
| WO | WO 2017/035751 A1 | 3/2017 |
| WO | WO 2017135881 A1 | 8/2017 |

OTHER PUBLICATIONS

International Preliminary Report on Patentability directed to related International Patent Application No. PCT/EP2019/058893, completed Aug. 25, 2020, with attached English-language translation; 21 pages.

Huawei et al., "Corrections to V2X in TS 36.300," vol. RAN WG2, No. Prague, Czech Requblic; Oct. 9-13, 2017, 3GPP Draft, 3rd Generation Partnership Project, 10 pages, Retrieved from the Internet at: http://www.3gpp.org/ftp/Meetings_3GPP SYNC/RAN2/Docs/.

* cited by examiner

COMMUNICATION DEVICE, CONTROL COMPONENT, MOBILE STATION, VEHICLE SYSTEM, METHOD AND COMPUTER PROGRAM FOR CONFIGURING LOCAL WIRE-FREE COMMUNICATION BETWEEN THE COMMUNICATION DEVICE AND A MOBILE DEVICE CLOSE TO A VEHICLE

TECHNICAL FIELD

Embodiments of the present disclosure relate to a communication device, a control component, a mobile station, a vehicle, a system, method, and computer programs for configuring local wireless communication between the communication device and a mobile device close to a vehicle. In particular, but not exclusively, additional frequency bands are configured or provided for a cellular application close to a vehicle.

BACKGROUND

It is known for a cellular vehicle-to-everything (C-V2X) application to provide communication protocols and a frequency band, which are used for the exchange of information between moving vehicles and other entities. This application is standardized, for example, by the 3rd Generation Partnership Project (3GPP) standardization organization. In accordance with the 3GPP TS (technical specification) standard 36.101, a frequency band at 5.9 GHz (band 47) is provided for this communication. This band is reserved for this purpose and is not used for mobile radio operation via stationary system elements such as base stations, network controllers, or the like so that mutual interference cannot occur. The C-V2X application operates the tape in a broadcast mode so that the information sent can be received by all receivers within range.

Systems such as Bluetooth, Bluetooth Low Energy, or WiFi are often used for communication in vehicles or in their surroundings. However, these suffer from the problem that the existing frequency spectrum is limited on the one hand and cannot be reliably assigned to the devices on the other. In addition, all three technologies use the same frequency spectrum (ISM—industry, science, and medicine—bands at 2.4 GHz and 5.8 GHz) in competition with one another. As a result, communication with the help of these technologies in the vehicle or the surroundings thereof is not always possible without restrictions or, in the worst case, can temporarily fail completely, for example, in the vicinity of a large number of WLAN hotspots or when many devices are simultaneously performing functions that cause interference, such as Bluetooth paging.

A powerful and undisturbed point-to-point connection is also of great importance for the "convoy driving" method supported by cellular mobile radio, for example, for trucks (platooning), in particular for safety functions.

U.S. Pat. No. 8,514,825 B1 discloses a method which comprises the connection of a vehicle access network. This comprises cooperative communication between a plurality of on-board units in respective vehicles and scanning of the vehicle access network in order to record coverage of at least one infrastructure access point.

DE 10 2014 117 360 B3 teaches a device, a method, and a computer program for a connection transceiver of a relay transceiver in a mobile communication system.

DE 102 43 826 A1 teaches a receiving part for a radio cell in a network with a frequency band from 1900 to 2200 MHz, in particular in a network based on UMTS or IMT2000 standard, in which superconducting filters are used to divide a received frequency band into sub-bands. Each of the superconducting filters is followed by an A/D converter (subordinate) to which the A/D converters have interfaces for further processing.

US 2017/0 289 733 A1 teaches a user equipment (UE) and a base station (BS) in a wireless communication network, in which the UE comprises a receiver which is configured to receive at least one semi-persistent scheduling (SPS) configuration from a plurality of Receive PLC configurations from a BS.

US 2018 1 0 098 322 A1 teaches a method that comprises receiving resource pool configuration information on a mobile device. The resource pool configuration information, in turn, comprises a bitmap for determining the resource pool. A first subset of subframes is determined for a period of time with a plurality of consecutive subframes.

BRIEF DESCRIPTION OF THE DRAWINGS/FIGURES

DETAILED DESCRIPTION

Figure 1:
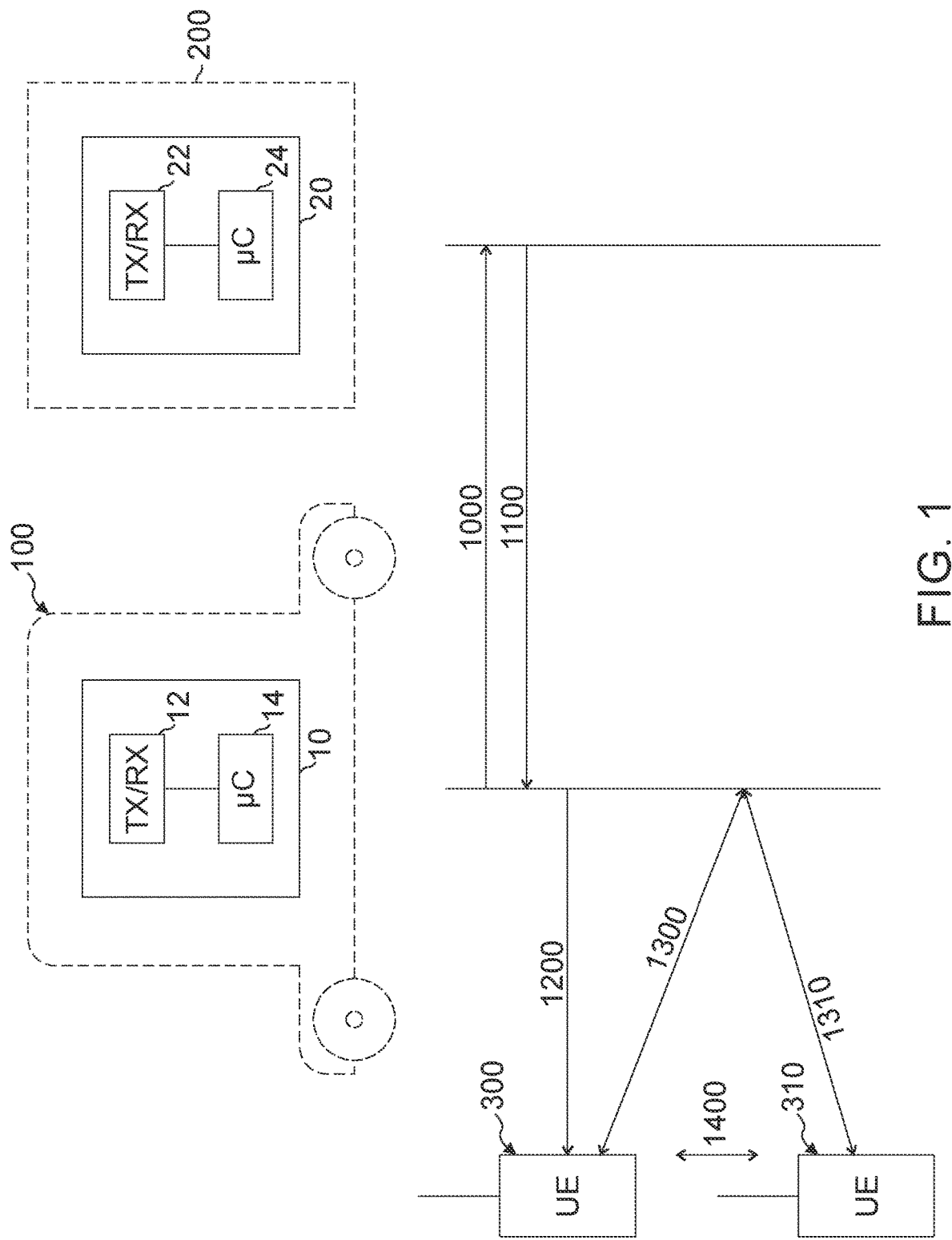
FIG. 1 illustrates a system with a mobile device, in accordance with some embodiments.

It is an objective of the present disclosure to create an improved concept for radio resource allocation for motor vehicle applications. The subject matter of the enclosed independent claims take this objective into consideration.

Embodiments are based on the core idea of making further frequency bands available for applications with very high data rates. These frequency bands should be largely free and not occupied by other services or applications. At the same time, unnecessary blocking of these frequency bands must be avoided in order to use this scarce resource efficiently. This can be done within and under the control of a mobile communication system. For example, the C-V2X system can only use the available frequency band. In this case, there is no point-to-point connection available for specific data exchange between specific devices, the content of which is not intended for all potential participants within range of the radio signal. This means that applications with a very high data rate, such as video streaming to multiple clients with different content or virtual reality applications in the vehicle, cannot be implemented. This finding applies to the known ISM bands 2.4 GHz and 5.8 GHz as well as to the mentioned C-V2X band at 5.9 GHz. Another core idea of the embodiments is to make further frequency bands of the cellular mobile radio system available for C-V2X applications on demand. These frequencies can be limited in terms of location, time, and with respect to their transmission power in order to avoid unnecessary occupancy or to give the control entities of the mobile communication system appropriate control options. At the same time, for example, frequency bands can be used that are largely unoccupied in the aforementioned conditions because they are assigned to operators of cellular mobile radio and are not further occupied by them according to the C-V2X applications. Correspondingly, an undisturbed data transfer can take place even for high data rates. For example, transmission powers and thus communication ranges can also be limited on these frequency bands in order to allow planning or coordination on these frequency bands.

Embodiments relate to a communication device for configuring a local wireless communication between the communication device and a mobile device close to a vehicle or between mobile devices close to a vehicle of a mobile radio system.

In some embodiments, the communication device is disclosed that comprises a transceiver which is designed to communicate with a control component of the mobile radio system. The communication device further comprises a control module for controlling the transceiver, said control module being designed to control the transceiver, wherein the control module is also designed to communicate in a first frequency band in the mobile radio system in order to obtain a configuration of a second frequency band of the mobile radio system for the local wireless communication. The control module is also designed for the configuration for the local wireless Furthermore, the control module is designed to continue to communicate the configuration for the local wireless communication in the second frequency band to at least one mobile device of the mobile radio system that is close to a vehicle. In this way, further undisturbed frequency bands from the frequency bands of cellular mobile radio can advantageously be assigned for direct communication.

In some embodiments, a control component of a mobile radio system for configuring local wireless communication between a communication device and mobile devices close to a vehicle or between mobile devices of a mobile radio system that are close to a vehicle is disclosed. The control component comprises a transceiver which is designed for communication with the communication device of the mobile radio system. The control component also comprises a control module for controlling the transceiver, said control module being designed to control the transceiver. The control module is also designed to communicate in a first frequency band in the mobile radio system in order to transmit a configuration of a second frequency band of the mobile radio system for the local wireless communication for use of the communication device with at least one mobile device close to a vehicle or between mobile devices close to a vehicle. The control module is also designed to forward the configuration for the local wireless communication in the second frequency band to at least one mobile device of the mobile radio system close to a vehicle. In this way, free frequency bands can advantageously be requested from the frequency bands of cellular mobile radio.

In yet another embodiment, a mobile station with a communication device in accordance with the above embodiments is disclosed. In this way, commercially available devices can be used. A vehicle with such a mobile station or with such a communication device is a further embodiment. In this way, a cost-effective implementation in the vehicle can advantageously be realized through the use of mobile stations, in particular, if these mobile stations are designed for general use in vehicles in accordance with a corresponding standard. Another embodiment is a system with a communication device and a control component according to embodiments.

In some embodiments, the communication can include a request from the communication device to the control component for the second frequency band, and receipt of a confirmation of an allocation of the second frequency band from the control component. In this way, an undisturbed second frequency band can be allocated on demand. In embodiments, the second frequency band can be predetermined at least in part by a previous subscription with a cellular mobile radio provider. In this way, frequency bands or parts thereof are assigned, which are suitable for conventional mobile radio devices and provided for this purpose by subscription.

In some embodiments, the transceiver of the communication device can be designed to use the first and second frequency bands. The communication device can thus be involved in the communication in the second frequency band. In embodiments, the mobile device close to a vehicle can be arranged in the vehicle, or outside the vehicle within a vehicle-to-vehicle (V2V) communication range of a PC5 interface. The second frequency band can thus advantageously benefit various applications for direct communication, for example, between mobile radio devices or between vehicles. The second frequency band can be designed as a broadcast frequency band or for bidirectional direct communication between mobile devices of the mobile radio system. The mobile device can be designed as a portable mobile device or as a further communication device installed in the vehicle. The agreements and thus the chipsets of the cellular mobile radio can thus advantageously be used, which can result in the devices used being cheaper. In embodiments, the second frequency band can be arranged, for example, at 900 MHz, 1900 MHz, 2600 MHz, 3500 MHz, or 3700 MHz.

In this way, mobile radio devices and communication devices can be used, which simplify and reduce implementation in terms of price and the diversity offered. The first and second frequency bands can be frequency bands used in embodiments of the cellular mobile radio standard 3GPP LTE (Long Term Evolution) standard. In this way, frequency bands, which are in particular suitable for high data throughput, are advantageously available. In some embodiments, the control module can be further designed to configure direct communication between the communication device and the at least one mobile device close to a vehicle or between at least two mobile devices of the mobile radio system that are close to a vehicle, using the second frequency band. Different applications can thus advantageously be covered. The use of the second frequency band of the cellular mobile radio standard can, at least in some embodiments, be limited in terms of the permissible transmission power, time, and/or space. The provision of the second frequency band is therefore advantageously limited to actual use.

In some embodiments, the control module can initiate a bidirectional communication between the communication device and the at least one mobile device close to a vehicle or between mobile devices of the mobile radio system that are close to a vehicle based on a physical layer, a security layer, and/or a network layer according to the open systems interconnection—OSI—model. In this way, tried and tested methods of cellular mobile radio, which are implemented in commercially available chipsets, can advantageously be adopted. In some further embodiments, the control module can initiate a bidirectional communication between the communication device and the at least one mobile device close to a vehicle or between mobile devices of the mobile radio system that are close to a vehicle based on a transport layer, a session layer, and/or a presentation layer according to the open systems interconnection—OSI—model. In this way, procedures that go beyond cellular mobile radio and are not restricted to the given processes can advantageously be agreed. Furthermore, in embodiments, a means of securing the bidirectional communication can comprise an authentication function and/or an encryption function. In this way, the misuse of wireless communication can advantageously be effectively prevented. In embodiments, the control module can be designed to allow a temporally and/or locally limited agreement of certificates for securing communication. The already given security against misuse can thus advantageously be increased further.

In some embodiments, the transceiver can be designed to allow at least one mobile device in the surroundings thereof to use the services of the mobile radio system. In this way, the locally connected devices can advantageously be allowed to use diverse functions of the cellular mobile radio network. In some embodiments, the communication device can be designed for operation in accordance with the cellular vehicle-to-everything—C-V2X—standard and can be arranged in a vehicle. In this way, commercially available devices can advantageously be used, which are based on standardized methods and are therefore available in greater numbers and at a lower cost.

The resources of the second frequency band of the mobile radio system can also be assigned in some embodiments as a function of a data rate and/or a quality of the service (QoS). In this way, the resources can advantageously be configured to match the intended application and quality specifications. The control component of the mobile radio network can be designed as a base station, a network controller, and/or as a server. Existing components of the cellular mobile radio can thus advantageously be used.

In some embodiments, a method for a communication device for configuring local wireless communication between the communication device and a mobile device close to a vehicle or between mobile devices of a mobile radio system that are close to a vehicle is disclosed. The method comprises a communication in a first frequency band in the mobile radio system for the configuration of a second frequency band of the mobile radio system for the local wireless communication. The method further comprises a communication of the configuration for the local wireless communication in the second frequency band to at least one mobile device of the mobile radio system close to a vehicle. In this way, additional frequency bands can advantageously be requested from the frequency bands of cellular mobile radio.

In some embodiments, a method for a control component of the mobile radio system for configuring local wireless communication between a communication device and mobile devices close to a vehicle or between mobile devices of a mobile radio system that are close to a vehicle is disclosed. This comprises communication in a first frequency band in the mobile radio system for the configuration of a second frequency band of the mobile radio system for the local wireless communication of the communication device with at least one mobile device close to a vehicle or between mobile devices close to a vehicle. The communication is also used for further communication of the configuration for the local wireless communication in the second frequency band to at least one mobile device of the mobile radio system close to a vehicle. In this way, further undisturbed frequency bands can advantageously be requested from the frequency bands of cellular mobile radio.

In some embodiments, computer programs for carrying out one of the methods according to some embodiments described herein are disclosed, which runs on a computer, a processor, or a programmable hardware component.

Different embodiments will now be described in more detail with reference to the accompanying drawings. In the drawings, the thickness dimensions of lines, layers, and/or regions may be exaggerated for the sake of clarity.

In the following description of the accompanying drawings, which only show a few embodiments, the same reference signs can designate the same or comparable components. Furthermore, summarizing reference signs can be used for components and objects that appear a plurality of times in an embodiment or in a drawing, but are described jointly with regard to one or more features. Components or objects that are described with the same or summarizing reference signs can be identical with regard to individual, a plurality of or all features, for example their dimensions, but possibly also different, unless the description explicitly or implicitly results in something else.

Although embodiments can be modified and changed in different ways, embodiments are shown in the drawings by way of example and are described in detail herein. It should be made clear, however, that the intention is not to restrict embodiments to the forms disclosed in each case, but rather that embodiments are intended to cover all functional and/or structural modifications, equivalents, and alternatives. The same reference signs denote the same or similar elements throughout the description of the figures.

Note that an element referred to as being "connected" or "coupled" to another element may be directly connected or coupled to the other element, or that intervening elements may be present. Conversely, when an element is said to be "directly connected" or "directly coupled" to another element, there are no intervening elements. Other terms used to describe the relationship between elements should be interpreted in a similar way (for example, "between" versus "directly between," "adjacent" versus "directly adjacent," etc.).

The terminology used herein is only used to describe particular embodiments and is not intended to limit the embodiments. As used herein, the singular forms "a," "an," and "the" are intended to include the plural forms as well, unless the context clearly indicates otherwise. It should also be made clear that the expressions such as, for example, "includes," "including," "has," "comprises," "comprising," and/or "having", as used herein, refer to the presence of named features, integers, steps, workflows, elements and/or components, but do not exclude the presence or addition of one or more characteristics, integers, steps, workflows, elements, components, and/or groups thereof.

Unless otherwise defined, all terms (including technical and scientific terms) used herein have the same meaning as assigned to them by an average person skilled in the art to which art the embodiments belong. It should also be clarified that terms, for example those defined in commonly used dictionaries, are to be interpreted as having the meaning that is consistent with their meaning in the context of the relevant art, and are not to be interpreted in an idealized or overly formal sense, as long as this is not expressly defined herein.

The components described here and in the following are described as "designed to" or "configured to" perform or fulfill a specific function, these terms being used synonymously and being interchangeable with one another. Such a component is able to perform the function described because, for example, appropriate software is available or held in a memory. For example, a control module that is configured or designed to control a transceiver module and is implemented in programmable hardware is to be interpreted to the effect that corresponding control software is available for controlling the transceiver module.

FIG. 1 illustrates a system with a mobile device, in accordance with some embodiments. In FIG. 1, a communication device 10 is shown that may be used for configuring local wireless communication between the communication device 10 and a mobile device 300/310 close to a vehicle or between mobile devices 300/310 of a mobile radio system that are close to a vehicle. The communication device 10 comprises a transceiver 12, which is designed for communication with a control component 20 of the mobile radio system. The communication device 10 also comprises a control module 14 for controlling the transceiver 12, said control module being designed to control the transceiver 12. The control module 14 is also designed to communicate in a first frequency band in the mobile radio system in order to obtain a configuration of a second frequency band of the mobile radio system for the local wireless communication. The control module 14 is also designed to continue to communicate 1200 the configuration for the local wireless communication in the second frequency band to at least one mobile device 300/310 of the mobile radio system that is close to a vehicle.

In accordance with some embodiments, the communication device 10 can be designed to operate in accordance with the cellular vehicle-to-everything—C-V2X— standard. Furthermore, in embodiments, the communication device 10 can be arranged in a vehicle 100. Another embodiment of a mobile station or a vehicle 100 with an embodiment of a communication device 10 is also shown in FIG. 1.

FIG. 1 shows an embodiment of a control component 20 of a mobile radio system for configuring local wireless communication between a communication device 10 and mobile devices 300, 310 close to a vehicle or between mobile devices 300, 310 of a mobile radio system that are close to a vehicle. The control component 20 comprises a transceiver 22 which is designed for communication with the communication device 10 of the mobile radio system; and a control module 24 for controlling the transceiver 22, said control module being designed to control the transceiver 22. The control module 24 is also designed to communicate in a first frequency band in the mobile radio system in order to transmit a configuration of a second frequency band of the mobile radio system for the local wireless communication. This allows the use of the communication device with at least one mobile device 300, 310 close to a vehicle or between mobile devices 300, 310 close to a vehicle. A forwarding operation of the configuration for the local wireless communication in the second frequency band to at least one mobile device (300, 310) of the mobile radio system close to a vehicle is provided. Further embodiments are a base station, a network controller, and a network server, each of which includes an embodiment of the control component 20. In embodiments, the control components of the mobile radio network can be designed as a base station, as a network controller, and/or as a server. With the 3GPP 2G-5G standards, these have different functions and different arrangements in the network component structure. Another embodiment is a system, for example a mobile communication system having a communication device 10 and a control component 20.

In accordance with some embodiments, a transceiver 12, 22 may include typical transceiver components, such as one or more low-noise amplifiers (LNAs), one or more power amplifiers (PAs), one or more duplexers, one or more diplexers, one or more filters or filter circuits, one or more converters, one or more mixers, appropriately adapted radio frequency components etc. The antennas can correspond to any transmitting and/or receiving antennas, like horn antennas, dipole antennas, patch antennas, sector antennas etc. The antennas can be arranged in a defined geometric arrangement, such as a uniform arrangement, a linear arrangement, a circular arrangement, a triangular arrangement, a uniform field, a field arrangement, or combinations of these arrangements.

In accordance with some embodiments, the control module 14, 24 can correspond to any desired controller, or processor, or a programmable hardware component. For example, a control device/module 14, 24 can also be implemented as software that is programmed for a corresponding hardware component. To this extent, a control module 14, 24 can be implemented as programmable hardware with appropriately adapted software. Any processors such as digital signal processors (DSPs) can be used. Embodiments are not restricted to a specific type of processor. Any number of processors or even a plurality of processors or microcontrollers for implementing the control module are conceivable. Implementations in integrated form with other control units are also conceivable, for example in a control unit for a vehicle, which additionally comprises one or more other functions. In embodiments, the method steps described herein can be carried out by the control modules 14, 24, or by, or by means of, the respective transceiver 12, 22. In this respect, the method steps described can be carried out by the device components. In accordance with some embodiments, a control module 14, 24 can be realized by a processor, a central processing unit (CPU), a graphics processing unit (GPU), a computer, a computer system, an application specific integrated circuit (ASIC) an integrated circuit (IC), a system on chip (SOC), a programmable logic cell or a field programmable gate array (FPGA).

In accordance with some embodiments, a transceiver, a mobile radio device, or a mobile device is adapted to a radio system, a mobile radio system, or mobile communication system, in the sense that it has the components required for communication in this regard, such as antennas, filters, amplifiers, one or more processors, displays, etc. Such systems comprise, for example, Bluetooth, Wireless Local Area Network (WLAN), Wireless Fidelity (WiFi), mobile radio, etc. For example, mobile radio systems that are standardized by the corresponding standardization bodies, such as of the 3rd Generation Partnership Project (3GPP) group, can be taken into consideration. For example, these include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as the Universal Mobile Telecommunication System (UMTS), Long Term Evolution (LTE) or LTE-Advanced (LTE-A), Fifth generation system (5G) or mobile radio systems of other standards, such as, for example, Worldwide Interoperability for Microwave Access (WIMAX), IEEE802.16 or Wireless Local Area Network (WLAN), IEEE802.11, and generally a system that runs on a Time Division Multiple Access (TDMA), Frequency Division Multiple Access (FDMA), Code Division Multiple Access (CDMA), Orthogonal Frequency Division Multiple Access (OFDMA), or another technology or multiple access method. In the following, the terms mobile radio system, mobile radio network, mobile communication system, and cellular radio network are used synonymously.

In accordance with some embodiments, a mobile radio system comprises at least one stationary transceiver in the sense of a base station which has a connection to the wired part of the mobile radio network. The mobile radio network comprises at least one mobile transceiver (mobile radio device, mobile radio terminal device), the term "mobile" in this case referring to the fact that this transceiver can be used to communicate via the air interface, i.e., wireless/cordless. Such a mobile transceiver can, for example, correspond to a portable telephone, a smartphone, a tablet computer, a portable computer, a vehicle, or a radio module that is not necessarily mobile in the sense that it actually moves in relation to its surroundings. The transceiver can also be stationary (e.g., relative to a motor vehicle), but communicate wirelessly with the mobile radio network. In this respect, the already mentioned base station can correspond to one of the standards mentioned above, for example, a NodeB, an eNodeB, etc.

In this regard, concepts for direct communication between mobile radio terminals are known which, for example, also use D2D, "device-to-device communication." Related extensions to communication between vehicles are known from standardization. Examples are the 3GPP V2V (vehicle-to-vehicle) communication as part of the C-V2X standard with the PC5 interface or also car-to-car communication with the 802.11p interface. In embodiments, one of these systems can be used and the communication device 10 or its transceiver 12 and control module 14 can be adapted accordingly. This applies analogously to the infrastructure-side control modules 20 along with the components thereof.

In accordance with some embodiments, a frequency band can be suitable for operating a cellular mobile radio system. It can be designed for unidirectional or bidirectional communication. For example, it can be divided into an uplink component and a downlink component at different frequencies, where each sub-band can have a specific bandwidth, e.g., 5 MHz, 10 MHz, 50 Mhz, 70 MHz, etc. It can be designed for broadcast traffic, the traffic between selected participants, and/or for point-to-point operation. In embodiments, frequency bands can be assigned according to the 3GPP plan, in which band 47 is provided for C-V2X at 5.9 GHz. The bands can be provided for the TDD (time division duplex) or the FDD (frequency division duplex) mode and be designed in accordance with the PC5 interface for vehicles in accordance with C-V2X.

In accordance with some embodiments, the V2V range can be a few hundred meters; this can be between 350 and 700 meters, for example. In accordance with some embodiments, the direct communication can be implemented as point-to-point communication in which the exchange of signals between the units involved takes place without detours via third parties. A mobile device close to a vehicle can be located within the vehicle or in the surroundings of the vehicle, the size of which is determined by the range of the PC5 interface signals, which is typically a few hundred meters, see above. In embodiments, bidirectional communication can include data transmission in both directions of a point-to-point connection. Signals or information can be exchanged alternately or simultaneously in both directions. In other words, the subject matter of embodiments is also in-vehicle communication using the V2X standard and the extension thereof.

In accordance with some embodiments, a mobile station can be designed as a communication device with additional components for securing an agreed interface and properties. For example, a vehicle-neutral interface can be defined which, in addition to the arrangement and meaning of individual signals, also defines the limitation of power consumption or a minimum transmission power. A plug connection to the vehicle can also be established. The properties can be standardized. The system can be implemented as the sum of all components of the mobile radio system, which includes all functions and devices required for operation. For example, the system can be designed according to one of the 3GPP standards 2G-5G. In embodiments, mobile devices can be designed as portable devices such as cell phones, tablets, laptops, portable computers, or as radio module or the like. They can also be designed as a component of clothing, accessories, for example as glasses, as a surf stick or the like. Mobile devices, also known as handheld devices, can also be assigned to users if the mobile devices can also communicate the user data.

FIG. 1 shows an embodiment of a method for a communication device 10 for configuring local wireless communication 1300/1310/1400 between the communication device 10 and mobile device 300/310 close to a vehicle or mobile devices 300/310 of a mobile radio system that are close to a vehicle. The method comprises a communication 1000/1100 in a first frequency band in the mobile radio system for the configuration of a second frequency band of the mobile radio system for the local wireless communication. The method further comprises a communication 1200 of the configuration for the local wireless communication in the second frequency band to at least one mobile device of the mobile radio system close to a vehicle.

In accordance with some embodiments, the communication can include a request 1000 from the communication device for the second frequency band, and the receipt of a confirmation 1100 of an allocation of the second frequency band.

Furthermore, in some embodiments, the mobile device 300/310 close to a vehicle can be arranged in a vehicle 100 or outside the vehicle 100 within a vehicle-to-vehicle V2V communication range of a PC5 interface, for example in another vehicle.

Figure 2:
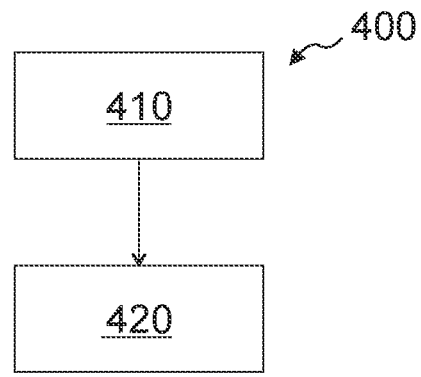
FIG. 2 illustrates a block diagram of a communication device, in accordance with some embodiments.

Furthermore, in some embodiments, the control component 20 of the mobile radio network can be designed as a base station, as a network controller, and/or as a server. The embodiment of FIG. 2 illustrates a block diagram of a communication device, in accordance with some embodiments. In FIG. 2, a communication device 10 for configuring local wireless communication between the communication device 10 and a mobile device 300/310 close to a vehicle or mobile devices 300/310 of a mobile radio system that are close to a vehicle is shown. These comprise a communication 410 in a first frequency band in the mobile radio system for the configuration of a second frequency band of the mobile radio system for the local wireless communication. The method further comprises a communication 420 of the configuration for the local wireless communication in the second frequency band to at least one mobile device 300/310 of the mobile radio system close to a vehicle.

Figure 3:
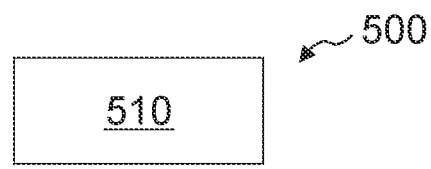
FIG. 3 illustrates a block diagram of a control components, in accordance with some embodiments.

FIG. 3 illustrates a block diagram of a control components, in accordance with some embodiments. The embodiment of FIG. 3 shows a block diagram of a method 500 for a control component 20 of the mobile radio system for configuring local wireless communication between a communication device 10 and mobile devices 300/310 close to a vehicle or between mobile devices 300/310 of a mobile radio system that are close to a vehicle. The method comprises a communication 510 in a first frequency band in the mobile radio system for the configuration of a second frequency band of the mobile radio system for the local wireless communication of the communication device with at least one mobile device 300/310 close to a vehicle or between mobile devices 300/310 close to a vehicle, for the communication of the configuration for the local wireless communication in the second frequency band to at least one mobile device 300/310 of the mobile radio system close to a vehicle.

In accordance with some embodiments, the method and the implementation derived therefrom are based on the system for direct communication with the aid of C-V2X communication according to Release 14 3GPP standard. This system was developed with a view to increasing road safety. It uses a message broadcast system for communication and an authentication backend to ensure the reliability of the information. Embodiments can expand this system. For example, today's 3GPP Release 14 standard (TS 36.101 Section 5.5G) uses a harmonized frequency band (ITS band in Europe, DSRC band in US, 3GPP band47) around 5.9 GHz, which corresponds to the second frequency band in embodiments. The existing 3GPP standard is based on a message broadcast system, thus unidirectional communication, which can be extended to bidirectional communication in embodiments. Thus, in embodiments, the transceivers 12, 22 can be designed for the use of the first and second frequency bands.

In accordance with some embodiments, the second frequency band can be designed as a radio frequency band for direct communication or for bidirectional communication between mobile devices of the mobile radio system. For example, from a vehicle 100 that comprises an embodiment of a communication device 100, a request for the use of the second frequency band 1000 is sent to a network controller 200 that includes an embodiment of the control component 20. The network controller 200 can now assign 1100 the frequency band and the communication device 10 in the vehicle 100 can now use the second frequency band. For example, the use of the second frequency band can be passed on to two UEs or mobile radio devices 300, 310. For example, a scenario in a car, bus, train, etc. is conceivable, wherein the communication device 10 is permanently installed in the vehicle and passes the second frequency resource on to passengers in the vehicle for use (e.g., video sharing, games, etc.). In some embodiments, the second frequency band can also continue to be used by the communication device 10 itself, for example for radio communication with other vehicles in the sense of V2V messages. In this respect, other vehicles can also be configured to use the second frequency band. The mobile device 300, 310 can therefore be designed as a portable mobile device or as a further communication device installed in the vehicle.

The control module 14 can therefore be designed to configure direct communication between the communication device 10 and the at least one mobile device 300, 310 close to a vehicle or between at least two mobile devices 300, 310 of the mobile radio system that are close to a vehicle using the second frequency band. The transceiver 12 and/or the control module 14 can be designed accordingly in embodiments to allow at least one mobile device 300, 310 in the surroundings thereof to use the services (voice and data services) of the mobile radio system. The use of frequencies of the mobile radio operators for in-vehicle communication can allow the connection of services of the mobile radio operators.

The transmission via a secure connection (encryption, authentication), which is already available in the 3GPP standard, can also allow the communication of sensitive content and the operation of system-critical functions via a radio interface. In embodiments, the first and second frequency bands of the cellular mobile radio standards can comprise frequency bands used by the 3GPP LTE standard. A means of securing the bidirectional communication can comprise an authentication function and/or an encryption function. In this case, at least in some embodiments the control module 14 can be designed to allow a temporally and/or locally limited agreement of certificates for securing communication. In general, the communication device 10 in embodiments can comprise a means of securing the bidirectional communication, an authentication function, and/or an encryption function.

As shown in FIG. 1 through FIG. 3, embodiments create methods and implementations in order to also be able to use existing communication hardware advantageously for communication within a vehicle 100 or in the surroundings thereof. Existing systems for communication in the vehicle such as Bluetooth, Bluetooth Low Energy, or WiFi can suffer from the problem that the existing frequency spectrum is limited on the one hand and cannot be reliably assigned to the devices on the other. In addition, all three technologies use the same frequency spectrum (ISM bands 2.4 GHz and 5.8 GHz) in competition with one another. As a result, communication with the help of these technologies in the vehicle is not always possible without restrictions or, in the worst case, can temporarily fail completely. For example, in the vicinity of a large number of WLAN hotspots (Wireless Local Area Network) in centers or when many devices are simultaneously performing functions that cause interference, such as Bluetooth paging. This means that applications with a very high data rate, such as video streaming to multiple clients with different content or virtual reality applications in the vehicle, cannot be implemented. In embodiments, the clients can be implemented as software applications—APPS—on a mobile device 300, 310.

In accordance with some embodiments, the method and the implementation derived therefrom can be based on the future system for direct communication with the aid of C-V2X communication according to Release 14 of the corresponding 3GPP standard. This system was developed with a view to increasing road safety. The 3GPP Release 14 standard (TS 36.101 Section 5.5G) uses a harmonized frequency band (ITS (Intelligent Transportation Systems) band in Europe, DSRC (Distributed Routing and Centralized Scheduling) band in the USA, 3GPP band 47 at 5.9 GHz to transmit the broadcast information described above. Embodiments can extend this usability of V2X communication to other 3GPP frequency bands. For example, band 41 (2600 MHz), band 42 (3500 MHz) or band 43 (3700 MHz). In embodiments, the second frequency band can be arranged, for example, at 900 MHz, 1900 MHz, 2600 MHz, 3500 MHz, or 3700 MHz.

When using frequency bands that are subject to licensing, the licensor is included in the system. The option of frequency management of the band 47 by the mobile radio network operator, also called operator, which is already available in the standard, can be used in embodiments to negotiate the temporally or spatially restricted use of licensed frequencies with limited power. In embodiments, the use of the second frequency band of the cellular mobile radio standard can be limited in terms of the permissible transmission power, time, and/or space. The control component 20 or the control module 24 located therein can thereby be given the option of resource monitoring, resource planning, and resource management.

In accordance with some embodiments, it is also conceivable to make an agreement with a specific operator in advance, using a subscription, for example in order to use parts of the LTE frequencies for in-vehicle communication with reduced transmission power. These parts of the LTE spectrum can then be used for communication between the communication device 20 and a mobile device 300 close to a vehicle or for communication between mobile devices 300, 310 close to a vehicle. In accordance with some embodiments, the second frequency band can be predetermined by a previous subscription with a cellular mobile radio provider. In embodiments, a subscription can correspond to a license for use, in this case a license for the use of a frequency band or part of a frequency band of an operator, for example for C-V2X operation. The license can be specified in terms of time, location, or with regard to the maximum allowed transmission power or time.

Figure 4:
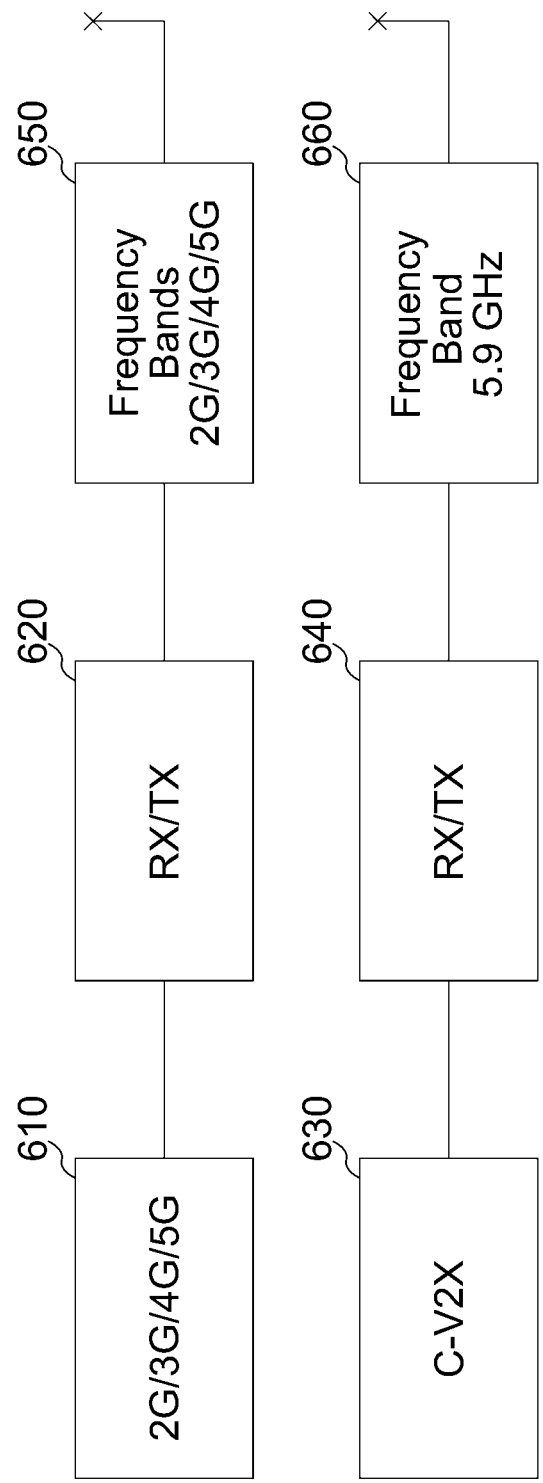
FIG. 4 illustrates a block diagram of a 2G/3G/4G/5G communication device and a separate communication device for the Cellular Vehicle-to-Everything (C-V2X) operation, in accordance with some embodiments.

The required change in the hardware design of the V2X communication unit can be implemented in a simplified manner using one or more additional filters and signal amplifiers. This should be explained in more detail on FIG. 4 through FIG. 6. FIG. 4 illustrates a block diagram of a 2G/3G/4G/5G communication device and a separate communication device for the Cellular Vehicle-to-Everything (C-V2X) operation, in accordance with some embodiments. FIG. 4 shows a communication device for cellular mobile radio according to the standards of the 2nd to 5th generation (2G-5G), as standardized in the 3rd Generation Partnership Project 3GPP. This communication device comprises a digital modem 610 for digital processing of the signals to be sent and received in accordance with the relevant standards. The digital modem 610 is connected or coupled to a transceiver 620, which performs the radio frequency processing of the modem signal and the received signals. The transceiver 620 is in turn connected to the frontend 650, in which filter elements for filtering the HF (high-frequency) bands of the standards of the aforementioned 2nd to 5th generation according to 3GPP and appropriate amplifiers (PAs, LNAs) are provided.

A communication device for C-V2X is shown separately, which comprises corresponding components. The digital modem 630 is used for digital processing of the signals to be sent and received in accordance with the C-V2X standard. The digital modem 630 is connected to a transceiver 640 which performs the high-frequency processing of the modem signal and the received signals. The transceiver 640 is in turn connected to the frontend 660, in which filter elements for filtering and corresponding amplifiers for the frequency band of the C-V2X standard are provided.

Figure 5:
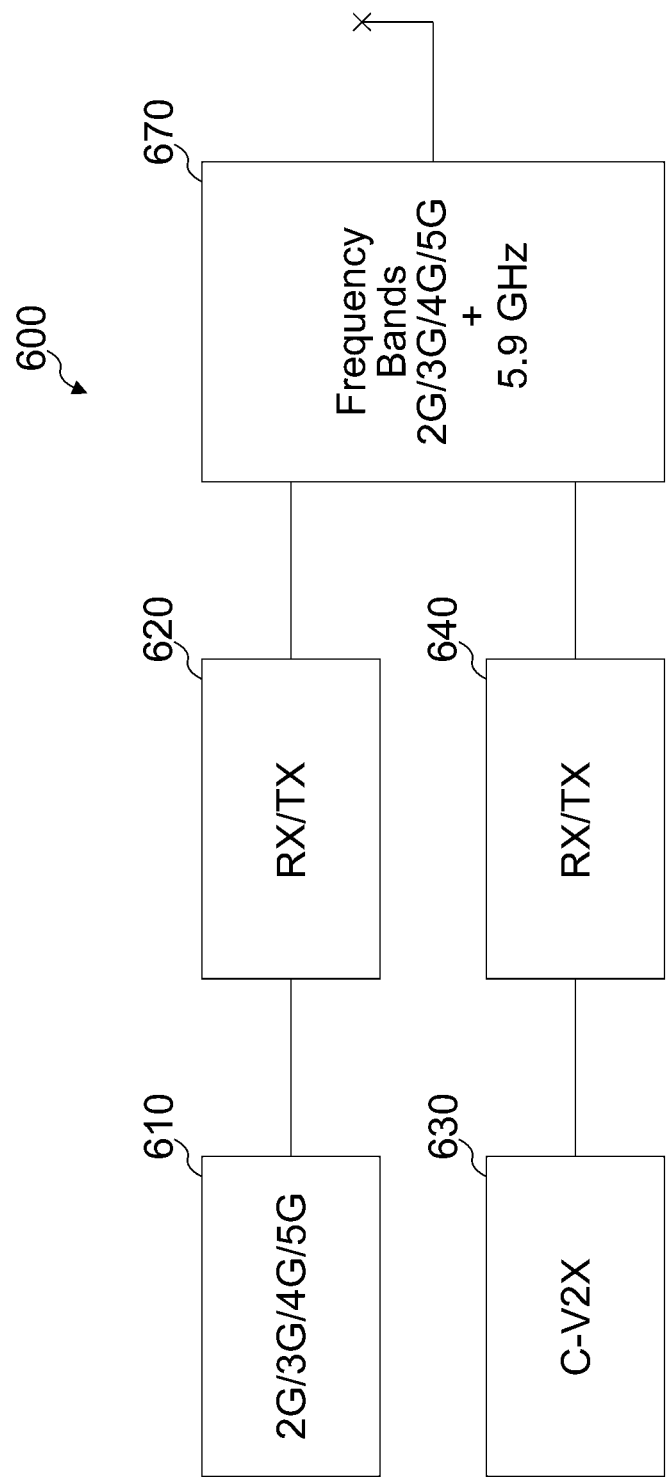
FIG. 5 illustrates a block diagram of a communication device for integrated 2G/3G/4G/5G and C-V2X operation, in accordance with some embodiments.

FIG. 5 illustrates a block diagram of a communication device for integrated 2G/3G/4G/5G and C-V2X operation, in accordance with some embodiments. FIG. 5 shows a transceiver 12 of a communication device 10. The components 610, 620, 630 and 640 have the functions described for FIG. 4. In contrast to FIG. 4, however, there is only one frontend 670 in this embodiment, which is designed for all frequency bands. As a result, signals of the frequency bands according to the standards of the 2nd-5th generation of cellular mobile radio can also be used for the C-V2X standard. The additional filters and amplifiers for the frequency band of the C-V2X are provided in the frontend 670.

Figure 6:
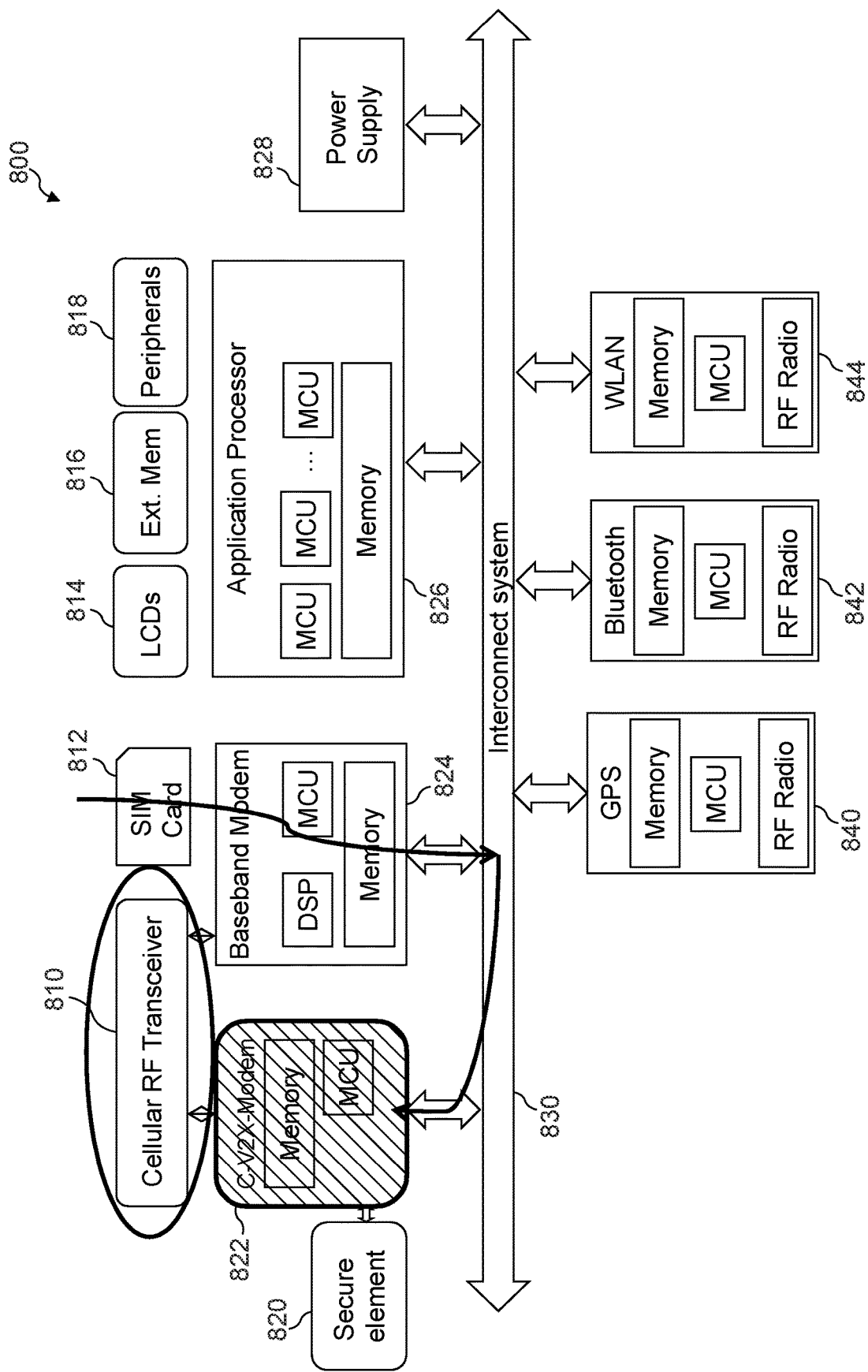
FIG. 6 illustrates is detailed block diagram of a communication device, in accordance with some embodiments.

FIG. 6 illustrates is detailed block diagram of a communication device, in accordance with some embodiments. FIG. 6 shows a further embodiment of a communication device 800 with connected transceivers for local devices, which are designed as a GPS module 840, a Bluetooth module 842, and a WLAN module 844. The connection to the communication device 800 is established via a connection system 830 (interconnect system), which can be designed, for example, as an internal bus system.

The communication device 800 comprises a transceiver 810 (cellular RF (radio frequency) receiver) for transmitting and receiving radio signals according to the standards and frequency bands of the 2nd to the 5th. generation of cellular mobile communications. The transceiver 810 is coupled to a C-V2X modem 822, which comprises a memory and a processor (MCU) for processing the transmission reception signals in accordance with the respective mobile radio standard.

The C-V2X modem 822 is for its part coupled to a secure element 820 for the storage of security-relevant data that are protected against unauthorized reading. The C-V2X modem 822 is also coupled to the connection system 830. The transceiver 810 is further coupled to a modem 824 for processing signals in accordance with the standards of the 2nd to the 5th generation of cellular mobile communications. The modem 824 comprises a digital signal processor (DSP), a further processor (MCU), and a memory. The C-V2X modem 822, the cellular RF receiver 810, and the baseband modem 824 correspond to the transceiver 12 and the components 610, 620, 630, 640, 670 from FIG. 5. The communication device 800 also comprises a SIM (subscriber identity module) card 812 in the associated reader to support the communication functions, one or more display units 814 (LCDs), an external memory 816 (ext. mem.) as well as a connection option for external devices 818 (peripherals). An application processor 826 comprises a plurality of processors (MCU) and storage devices (memory). The application processor is coupled to the connection system 830. A power supply 828 is also coupled to the connection system 830.

The GPS module 840, the Bluetooth module 842, and the WLAN module 844 each include a memory, a processor (MCU) and a transceiver module according to the corresponding standard.

In FIG. 6, the arrows indicate the method in one embodiment. The C-V2X Modem 822 is configured for communication with the environment (direct communication) in accordance with a network operator via SIM credentials (identifiers stored on the SIM card). The cellular RF transceiver (modem) 810 can then be modified according to FIG. 5. Embodiments accordingly also provide for an expansion of a broadcast component to include the bidirectional communication component on ISO (International Organization for Standardization) layers 1-3. In embodiments, the control module 14 can also cause a bidirectional communication between the communication device 10 and the at least one mobile device 300/310 close to a vehicle or between mobile devices 300/310 of the mobile radio system that are close to a vehicle, for example based on a physical layer, a security layer, and/or a network layer according to the open systems interconnection—OSI—model. The control module 14 can initiate a bidirectional communication between the communication device 10 and the at least one mobile device 300/310 close to a vehicle or between mobile devices 300/310 of the mobile radio system that are close to a vehicle based on a transport layer, a session layer, and/or a presentation layer according to the open systems interconnection—OSI—model. Alternatively, bidirectional communication can also be implemented on higher ISO/OSI layers, regardless of the underlying mobile radio standard.

For this purpose, dedicated resources can be allocated depending on the required data rate and the desired QoS and agreed to be dedicated to a specific radio connection between two participants. In embodiments, a data rate can be understood as a transmission speed or transmission rate. It is the number of information units that are transmitted over the transmission medium, over an interface, or over a transmission channel in a certain time. In embodiments, QoS (Quality of Service) can be understood as the quality of a communication service from the perspective of the user. It indicates how closely the quality of the service matches its requirements. In the embodiments, QoS consists of a large number of quality requirements for the common behavior or interaction of a plurality of units.

In embodiments, resources of the second frequency band of the mobile radio system can be assigned, for example, depending on a data rate and/or a quality of the service, QoS. The use of frequencies of the mobile radio operators for in-vehicle communication can also allow the connection of services of the mobile network operators. The communication device 10 can accordingly be designed to allow at least one mobile device 300, 310 in the surroundings thereof to use the services (voice services, video services, data services) of the mobile radio system.

For example, the transmission via a secure connection (encryption, authentication), which is already available in the 3GPP standard, can also allow the communication of sensitive content and the operation of system-critical functions via a radio interface. For this purpose, the authentication system of direct communication can be used in embodiments and expanded with the option of receiving temporary and locally limited certificates for securing communication via the network operator. In embodiments, a means of securing the bidirectional communication can comprise an authentication function and/or an encryption function. The control module 14 can then be designed to allow a temporally and/or locally limited agreement of certificates for securing communication.

In accordance with some embodiments, an authentication can be a proof (verification) of an alleged property of an entity, which can be implemented as a device, for example. The alleged property is verified by a suitable operation, which in embodiments can be based on a secret key. The property can be an identity of the device. In accordance with some embodiments, encryption can be designed as the key-dependent conversion of data called "plain text" into "ciphertext" so that the plain text can only be retrieved from the ciphertext with the aid of a secret key. In this way, data can be protected against unauthorized access.

In accordance with some embodiments, a certificate can be understood as a digital data record which confirms specific properties of people or objects and whose authenticity and integrity can be checked using cryptographic methods. In particular, the certificate contains the data required for its verification. A certificate is issued by a certification unit. In further embodiments, an authentication backend can be understood as a device which carries out a local authentication in a secure environment and keeps the result ready for comparison with a remote authentication operation.

Embodiments also create a computer program for carrying out at least one of the methods described above, when the computer program runs on a computer, a processor, or a programmable hardware component. Embodiments also provide a digital storage medium that is machine-readable or computer-readable and that has electronically readable control signals that can interact with a programmable hardware component in such a way that one of the methods described above is carried out.

The features disclosed in the above description, the following claims, and the accompanying drawings can be important and implemented both individually and in any combination for the realization of an embodiment in its various configurations.

Although some aspects have been described in connection with a device, it goes without saying that these aspects also represent a description of the corresponding method, so that a block or a component of a device is also to be understood as a corresponding method step or as a feature of a method step. Analogously, aspects that have been described in connection with or as a method step also represent a description of a corresponding block or detail or feature of a corresponding device.

Depending on the specific implementation requirements, embodiments of the present disclosure can be implemented in hardware or in software. The implementation can be carried out using a digital storage medium, for example, a floppy disc, a DVD, a Blu-ray disc, a CD, a ROM, a PROM, an EPROM, an EEPROM or a FLASH memory, a hard drive or other magnetic or optical storage device, on which electronically readable control signals are stored, which can or do work together with a programmable hardware component, such that the respective method is carried out.

A programmable hardware component can be formed by a processor, a central processing unit (CPU), a graphics processing unit (GPU), a computer, a computer system, an application specific integrated circuit (ASIC), an integrated circuit (IC), a system on chip (SOC), a programmable logic cell or a field programmable gate array (FPGA).

The digital storage medium can therefore be machine or computer readable. Some embodiments thus include a data carrier that has electronically readable control signals that are able to interact with a programmable computer system or a programmable hardware component in such a way that one of the methods described herein is carried out. One embodiment is thus a data carrier (or a digital storage medium or a computer-readable medium) on which the program for performing one of the methods described herein is recorded.

In general, embodiments can be implemented as a program, firmware, computer program, or computer program product with a program code or as data, the program code or the data being effective to carry out one of the methods when the program runs on a processor or a programmable hardware component. The program code or the data can, for example, also be stored on a machine-readable carrier or data carrier. The program code or the data can be present as source code, machine code, or bytecode, as well as other intermediate code, among other things.

A further embodiment is also a data stream, a signal sequence, or a sequence of signals, which represents the program for performing one of the methods described herein. The data stream, the signal sequence or the sequence of signals can, for example, be configured to be transferred via a data communication connection, for example via the Internet or another network. Embodiments are thus also data-representing signal sequences which are suitable for transmission over a network or a data communication connection, the data representing the program.

A program according to an embodiment can implement one of the methods while it is being carried out, for example, by reading out memory locations or writing data or a plurality of data into them, which may result in switching operations or other operations in transistor structures, in amplifier structures or in other electrical, optical, magnetic, or components working according to another functional principle. Accordingly, data, values, sensor values, or other information can be detected, determined, or measured by a program by reading out a memory location. A program can therefore detect, determine, or measure variables, values, measured variables, and other information by reading out one or more memory locations, and by writing to one or more memory locations it can cause, initiate, or carry out an action and control other devices, machines, and components.

The embodiments described above merely represent an illustration of the principles. It is understood that modifications and variations of the arrangements and details described herein will become apparent to another person skilled in the art. It is therefore intended that the scope of protection of the following claims is not limited by specific details presented herein with reference to the description and explanation of the embodiments.

LIST OF REFERENCE SIGNS

10 Communication device
12 Transceiver
14 Control module
20 Control component
22 Transceiver
24 Control module
100 Vehicle
200 Base station, network controller and/or server
300 Mobile device
310 Mobile device
400 Method for a communication device
410 Communication in the mobile radio system
420 Communication in the mobile radio system
500 Method for a control component
510 Communication in the mobile radio system
600 Block diagram
610 digital 2G-5G modem
620 Transceiver
630 digital C-V2X modem
640 Transceiver
650 Frontend 2G-5G
660 Frontend C-V2X
670 Frontend 2G-5G and C-V2X
800 Communication device
810 Transceiver
812 SIM card
814 Display
816 External memory
818 Connection for external devices
820 Secure element
822 C-V2X modem
824 2nd to 5th G modem
826 Application processor
828 Power supply
830 Connection system
840 GPS module
842 Bluetooth module
844 WLAN module
1000 Request of the communication device for the second frequency band
1100 Receiving a confirmation of an allocation of the second frequency band
1200 Communication of the configuration for the local wireless communication in the second frequency band to at least one mobile device close to a vehicle
1300 Communication between mobile device and communication device
1310 Communication between communication device and mobile device
1400 Communication between mobile devices

The invention claimed is:

1. A communication device for configuring local wireless communication between the communication device and a first mobile device of a mobile radio system or between the first mobile device and a second mobile device of the mobile radio system, wherein the first mobile device or the second mobile device is proximate to a vehicle, the communication device comprising:
a transceiver configured for communication with a control component of the mobile radio system;
a processor coupled to the transceiver, wherein the processor is configured to control the transceiver, wherein the processor is further configured to:
communicate a request to the control component of the mobile radio system in a first frequency band to obtain a configuration of a second frequency band of the mobile radio system for the local wireless communication, wherein the second frequency band is an unoccupied cellular mobile radio frequency band;
receive an allocation of the second frequency band from the control component of the mobile radio system wherein resources of the second frequency band are configured to match a data rate and/or a quality of service (QoS) of an intended application;
communicate the obtained configuration of the second frequency band to the first mobile device and/or the second mobile device of the mobile radio system for local wireless communication; and
configure the local wireless communication in the second frequency band to connect with at least one mobile device of the mobile radio system proximate to the vehicle, the proximate to the vehicle being between 350 and 700 meters of the vehicle,
wherein connections in the first frequency band and the second frequency band are configured for bidirectional communication, and
wherein the bidirectional communication comprises at least an encryption function.

2. The communication device of claim 1, wherein the second frequency band is at least partially predetermined by a previous subscription with a cellular mobile radio provider.

3. The communication device of claim 1, wherein the first mobile device or the second mobile device is in the vehicle.

4. The communication device of claim 1, wherein the first and second frequency bands of the cellular mobile radio standards are frequency bands used by a 3rd Generation Partnership Project (3GPP) long-term evolution (LTE) standard.

5. The communication device of claim 1, wherein the processor is further configured to support a direct communication between the communication device and the first mobile device or between the first and the second mobile devices using the second frequency band.

6. The communication device of claim 1, wherein the processor is further configured to limit use of the second frequency band temporally or spatially according to transmission power corresponding to the second frequency band.

7. The communication device of claim 1, wherein the transceiver is further configured to allow the first mobile device or the second mobile device to use a service of the mobile radio system.

8. The communication device of claim 1, wherein the processor is further configured to allow the first mobile device or the second mobile device to use a service of the mobile radio system.

9. The communication device of claim 1, wherein the processor is further configured to communicate with the first mobile device or the second mobile device using cellular vehicle-to-everything (C-V2X) standard for securing the bidirectional communication, wherein the bidirectional communication comprises an authentication function.

10. The communication device of claim 1, wherein the second frequency band of a plurality of cellular frequency bands of the mobile radio system is an undisturbed frequency band, not occupied by other services or applications.

11. A network controller of a mobile radio system for configuring local wireless communication between a communication device of a vehicle and a first mobile device or between the first mobile device and a second mobile device of a mobile radio system that are proximate to the vehicle, the network controller comprising:
- a transceiver configured for communication with a communication device of the mobile radio system;
- a processor for controlling the transceiver, wherein the processor is coupled to the transceiver, and wherein the processor is further configured to:
- communicate with the mobile radio system in a first frequency band to obtain a configuration of a second frequency band of the mobile radio system for the local wireless communication for use of the communication device of the vehicle with the first mobile device of the second mobile device proximate to the vehicle or between the first and the second mobile devices proximate to the vehicle, wherein the second frequency band is an unused mobile frequency band;
- receive a confirmation of an allocation of the second frequency band from a control component of the mobile radio system wherein resources of the second frequency band are configured to match a data rate and/or a quality of service (QoS) of an intended application;
- communicate the obtained configuration of the second frequency band to the first mobile device and/or the second mobile device of the mobile radio system for local wireless communication; and
- forward the obtained configuration for the local wireless communication in the second frequency band to the first mobile device or the second mobile device proximate to the vehicle, the proximate to the vehicle being between 350 and 700 meters of the vehicle,
- wherein the first frequency band and the second frequency band are configured for bidirectional communication, and
- wherein the bidirectional communication comprises at least an encryption function.

12. The network controller of claim 11, wherein the network controller is configured as a base station or a server.

13. A method for a communication device of a vehicle for configuring local wireless communication between the communication device and a first mobile device proximate to the vehicle, or the first mobile device and a second mobile device of a mobile radio system that are proximate to the vehicle, the method comprising:
- communicating with the mobile radio system in a first frequency band for obtaining configuration of a second frequency band of the mobile radio system for the local wireless communication, wherein the second frequency band is an unoccupied cellular mobile radio frequency band;
- receiving a confirmation of an allocation of the second frequency band from a control component of the mobile radio system wherein resources of the second frequency band are configured to match a data rate and/or a quality of service (QoS) of an intended application;
- communicating the obtained configuration of the second frequency band to the first mobile device and/or the second mobile device of the mobile radio system for local wireless communication; and
- communicating with the first mobile device or the second mobile device using the configuration of the second frequency band for the local wireless communication proximate to the vehicle, the proximate to the vehicle being between 350 and 700 meters of the vehicle,
- wherein connections in the first frequency band and the second frequency band are configured for bidirectional communication, and
- wherein the bidirectional communication comprises at least an encryption function.

14. A method for a processor of a mobile radio system for configuring local wireless communication between a communication device of vehicle and a first mobile device proximate to the vehicle, or between the first mobile device and a second mobile device of the mobile radio system that are proximate to the vehicle, the method comprising:
- communicating in a first frequency band in the mobile radio system for obtaining configuration of a second frequency band of the mobile radio system for the local wireless communication of the communication device of the vehicle with the first mobile device or between the first and the second mobile devices, wherein the second frequency band is an unused mobile frequency band;
- receiving a confirmation of an allocation of the second frequency band from a control component of the mobile radio system wherein resources of the second frequency band are configured to match a data rate and/or a quality of service (QoS) of an intended application;
- communicating the obtained configuration of the second frequency band to the first mobile device and/or the second mobile device of the mobile radio system for local wireless communication; and
- communicating with the first mobile device or the second mobile device using the configuration of the second frequency band for the local wireless communication proximate to the vehicle, the proximate to the vehicle being between 350 and 700 meters of the vehicle,
- wherein connections in the first frequency band and the second frequency band are configured for bidirectional communication, and
- wherein the bidirectional communication comprises at least an encryption function.

15. A non-transitory, computer-readable medium, comprising machine-readable instructions that, when executed by a processor of a computing device, cause the computing device to at least:
- communicate in a first frequency band in a mobile radio system for obtaining configuration of a second frequency band of the mobile radio system for local wireless communication of a communication device of a vehicle with a first mobile device, or between the first mobile device and a second mobile device, wherein the first mobile device or the second mobile device is proximate to the vehicle, wherein the second frequency band is an unoccupied cellular mobile radio frequency band;

receive an allocation of the second frequency band from the control component of the mobile radio system wherein resources of the second frequency band are configured to match a data rate and/or a quality of service (QoS) of an intended application;

communicate the obtained configuration of the second frequency band to the first mobile device and/or the second mobile device of the mobile radio system for local wireless communication; and communicate with the first mobile device or the second mobile device using the configuration of the second frequency band for the local wireless communication proximate to the vehicle, the proximate to the vehicle being between 350 and 700 meters of the vehicle, wherein connections in the first frequency band and the second frequency band are configured for bidirectional communication, and wherein the bidirectional communication comprises at least an encryption function.

* * * * *